United States Patent [19]

Kano et al.

[11] Patent Number: 4,622,165

[45] Date of Patent: Nov. 11, 1986

[54] LIQUID CRYSTAL MIXTURE OF A LIQUID CRYSTAL COMPOUND HAVING A SMECTIC C PHASE AND AN OPTICALLY ACTIVE COMPOUND

[75] Inventors: Mitsuru Kano; Yoshinori Kato; Yoshimi Kamijo, all of Furukawa; Masahiro Hatano, 2-21-1 Nakayama, Sendai-shi, Miyagi-ken, all of Japan

[73] Assignees: Alps Electric Co., Ltd; Masahiro Hatano, both of Japan

[21] Appl. No.: 635,263

[22] Filed: Jul. 27, 1984

[30] Foreign Application Priority Data

Jul. 27, 1983 [JP] Japan ................. 58-135743

[51] Int. Cl.$^4$ ............. C09K 3/34; G02F 1/13
[52] U.S. Cl. .............. 252/299.65; 252/299.01; 252/299.63; 252/299.64; 252/299.67; 350/350 S
[58] Field of Search ........... 252/299.65, 299.67, 252/299.01, 299.64, 299.63; 350/350 R, 350 S

[56] References Cited

U.S. PATENT DOCUMENTS

| Re. 31,715 | 10/1984 | Coates et al. | 252/299.65 |
|---|---|---|---|
| 4,149,413 | 4/1979 | Gray et al. | 252/299.64 |
| 4,195,916 | 4/1980 | Coates et al. | 252/299.01 |
| 4,257,911 | 3/1981 | Gray et al. | 252/299.65 |
| 4,514,045 | 4/1985 | Huffman et al. | 252/299.1 |
| 4,556,727 | 12/1985 | Walba | 252/299.5 |
| 4,576,732 | 3/1986 | Isogai et al. | 252/299.65 |

FOREIGN PATENT DOCUMENTS

| 115693 | 8/1984 | European Pat. Off. | 252/299.63 |
|---|---|---|---|
| 131373 | 1/1985 | European Pat. Off. | 252/299.65 |
| 136725 | 4/1985 | European Pat. Off. | 252/299.67 |
| 156726 | 10/1985 | European Pat. Off. | 252/299.67 |
| 58-13545 | 1/1983 | Japan | 252/299.63 |
| 58-13546 | 1/1983 | Japan | 252/299.63 |
| 58-55447 | 4/1983 | Japan | 252/299.63 |
| 59-128357 | 7/1984 | Japan | 252/299.65 |
| 59-219251 | 12/1984 | Japan | 252/299.63 |

OTHER PUBLICATIONS

Goodby, J. W., et al, Liquid Crystals and Ordered Fluids, vol. 4, Griffin, A. C., et al, ed., pp. 1–32, Plenum Press, N.Y. (1984), Presented at ACS Symposium, Las Vegas, Nevada, Mar. 29–Apr. 1, 1982.
Goodby, J. W., et al, J. de Physique, Coll. C3, Suppl. 4, vol. 40, pp. C3-27-36 (Apr. 1979).
Gray, G. W., et al., Mol. Cryst. Liq. Cryst., vol. 37, pp. 157-211 211 (1976).
Goodby, J. W., et al., Mol. Cryst. Liq. Cryst., vol. 34 (Letters) pp. 183–188 (1977).
Demus, D., et al, Flussige Kristalle in Tabellen, Veb Deutscher Verlag für Grundstoffindustrie, Leipzig, pp. 63–69 (1974).
Coates, D., et al, Mol. Cryst. Liq. Cryst., vol. 41 (Letters) pp. 197–202 (1978).
C.A., vol. 93, 86116x (1980).
C.A., vol. 96, 133710k (1982).

*Primary Examiner*—Teddy S. Gron
*Attorney, Agent, or Firm*—Guy W. Shoup

[57] ABSTRACT

A liquid crystal composition which comprises a liquid crystal compound having a smectic C phase and an optically active substance, both of said liquid crystal compound and optically active substance being compounds having an ester type bond in the molecular structure, and which has a lowered transition temperature region for the smectic C phase, is chemically stable and stable for use in field effect type liquid crystal display elements etc.

13 Claims, No Drawings

LIQUID CRYSTAL MIXTURE OF A LIQUID CRYSTAL COMPOUND HAVING A SMECTIC C PHASE AND AN OPTICALLY ACTIVE COMPOUND

BACKGROUND OF THE INVENTION

1. Field of the Invention

This invention relates to liquid crystal compositions, and more specifically, it relates to liquid crystal compositions which are adopted for manifesting a chiral smectic C (hereinafter referred to as SmC*) phase.

2. Description of the Prior Art

Most of the action modes of the conventional liquid crystal display elements have been of a field effect type utilizing a nematic liquid crystal or a chiral nematic liquid crystal. More recently, there has been proposed a liquid crystal display element of a new action mode different from the above, that is, a field effect type liquid crystal display element permitting a high speed response by employing a ferroelectric SmC* phase appeared with a ferroelectric liquid crystal DOBAMBC:

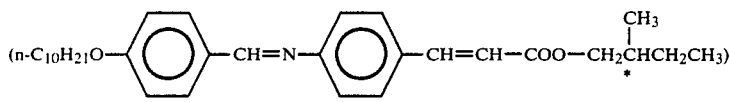

However, although it was essential for such a liquid crystal display element that the temperature region where the SmC* phase is manifested be the use temperature range for the liquid crystal display element and also that it be stable, said ferroelectric liquid crystal DOBAMBC had such high temperature region for the SmC* phase as about 70°–95° C. and further this was relatively unstable, and therefore its industrialization seemed difficult.

An object of this invention is to eliminate the drawback of the conventional technique and provide liquid crystal compositions having a lowered temperature region for the SmC* phase, chemically stable and suitable for use in field effect type liquid crystal display elements etc.

SUMMARY OF THE INVENTION

Accordingly, this invention provides liquid crystal compositions which comprise a liquid crystal compound having a smectic C phase and an optically active substance, both of said liquid crystal compound and optically active substance being compounds having a chemically stable ester type bond in the molecular structure.

DETAILED DESCRIPTION OF THE PREFERRED EMBODIMENTS

The liquid crystal compound used in this invention may be exemplified by compounds of the following general structural formula:

General Structural Formula

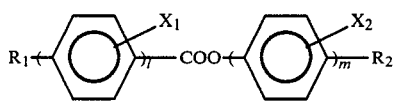

wherein $R_1$ and $R_2$ each represent $-C_xH_{2x+1}$ or $-OC_xH_{2x+1}$ wherein x is an integer of 1–15, z and m are each an integer of 1, 2 or 3, and $X_1$ and $X_2$ each represent hydrogen, halogen, cyano or nitro.

More specifically, compounds of the following structural formula are employed.

Structural Formula

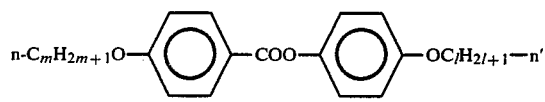

wherein m and z are each an integer of 1–15.

Of the compounds of the above structural formula, the following are particularly preferred.

(1) p'-n'-Octyloxyphenyl p-n-octyloxybenzoate

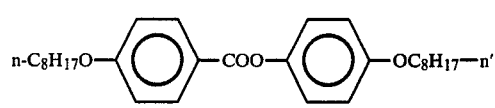

(2) p'-n'-Hexyloxyphenyl p-n-decyloxybenzoate

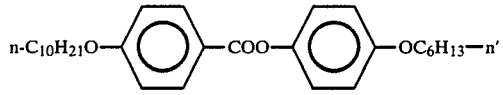

(3) p'-n'-Hexylphenyl p-n-nonanoxybenzoate

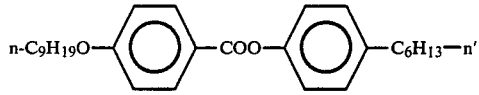

The optically active substance used in this invention may be exemplified by compounds of the following general structural formula:

General Structural Formula

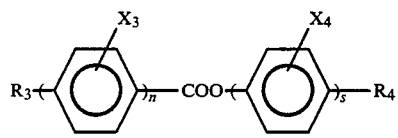

wherein $R_3$ and $R_4$ each represent $-R^*$, $-OR^*$, $-C_xH_{2x+1}$ or $-OC_xH_{2x+1}$ wherein $R^*$ represents alkyl containing an asymmetric carbon atom, x is an integer of 1–15, and at least one of $R_3$ and $R_4$ is $-R^*$ or $-OR^*$, n and s are each an integer of 1, 2 or 3, and $X_3$ and $X_4$ each represent hydrogen, halogen, cyano or nitro.

More specifically, compounds of the following structural formulae are employed.

Structural Formula 1

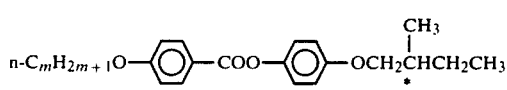

Structural Formula 2

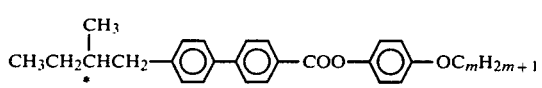

Structural Formula 3

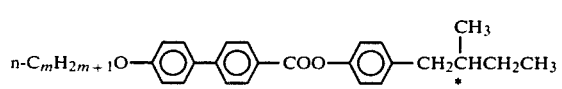

wherein m is an integer of 1–15, and $\overset{*}{C}$ is an asymmetric carbon atom.

Of the compounds of the above structure formulae, the following are particularly preferred.

(1) p'-Act-amyloxyphenyl p-n-hexyloxybenzoate

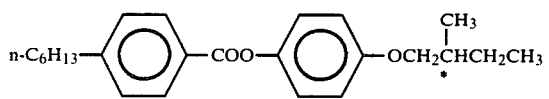

(2) p-n-Hexyloxyphenyl 4-act-amyl-biphenylcarboxylate

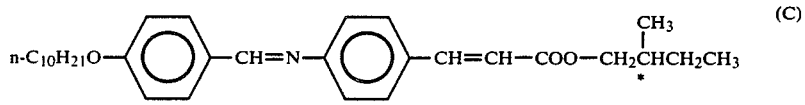

(3) p-Act-amylphenyl 4-n-ocyloxybiphenylcarboxylate

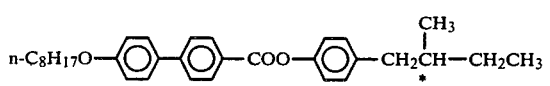

It is essential for this invention to appropriately combine a liquid crystal compound having a SmC phase and also having an ester type bond in the molecular structure with an optically active substance having an ester type bond in the molecular structure as described above; of the combinations thereof, a combination of p'-n'-octyloxyphenyl p-n-octyloxybenzoate selected as the liquid crystal compound and p'-act-amyloxyphenyl p-n-hexyloxybenzoate selected as the optically active substance is particularly preferred since the phase transition temperatures of the SmC* phase in the cooling period and the heating period are low.

This invention is more particularly described by the following examples.

EXAMPLES 1–5

Liquid crystal compositions were prepared by selecting Compound (A) below as a liquid crystal compound and Compound (B) below as an optically active substance and mixing these respectively.

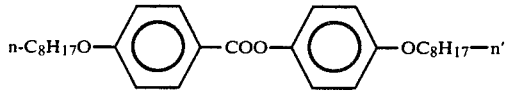

(p'-n'-Octyloxyphenyl p-n-octyloxybenzoate)

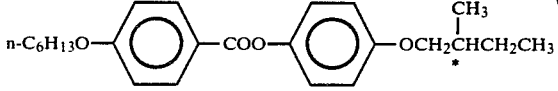

(p'-Act-amyloxyphenyl p-n-hexyloxybenzoate)

The phase transition temperature regions of the SmC* phase in the cooling period and the heating period when changing the mixing ratio of Compound (A) to Compound (B) were examined, and the results are shown in the following Table 1. This table also shows comparative examples, i.e., Comparative Example 1 is for a case where Compound (C) below was used alone, Comparative Example 2 for Compound (D) alone, Comparative Example 3 for Compound (E) alone, Comparative Example 4 for an equal weight mixture of said Compounds (B) and (F) and Comparative Example 5 for an equal weight mixture of said Compounds (B) and (G).

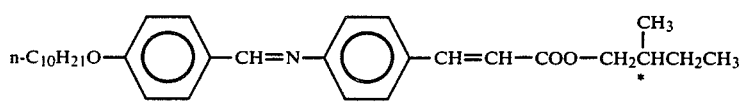

(DOBAMBC)

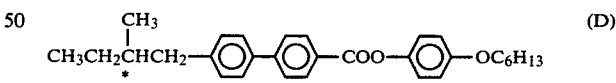

(p-n-Hexyloxyphenyl 4-act-amyl-biphenylcarboxylate)

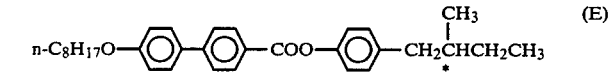

(p-Act-amylphenyl 4-n-octyloxybiphenylcarboxylate)

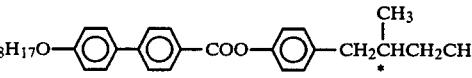

(p'-Ethoxyphenyl 4-n-butylcyclohexanecarboxylate)

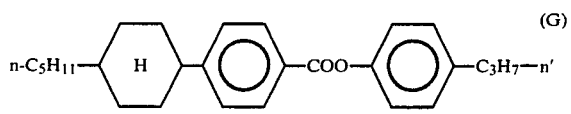

(p'-n'-Propylphenyl 4-n-heptylcyclohexylbenzoate)

TABLE 1

| | Compositional Ratio (% by weight) | Phase Transition Temperature Region of the SmC* Phase | |
|---|---|---|---|
| | | Cooling Period | Heating Period |
| Example 1 | (A):(B) = 80:20 | 61.2–35.7 | 62.0–47.0 |
| Example 2 | (A):(B) = 60:40 | 49.8–16.5 | 49.9–39.5 |
| Example 3 | (A):(B) = 50:50 | 49.6–8.0 | 49.9–32.0 |
| Example 4 | (A):(B) = 40:60 | 49.5–17.0 | 51.0–42.0 |
| Example 5 | (A):(B) = 20:80 | 48.0–35.0 | 50.0–42.0 |
| Comparative Example 1 | (C) alone | 95.0–67.0 | 95.0–75.0 |
| Comparative Example 2 | (D) alone | 80.2–68.8 | 80.2–68.8 |
| Comparative Example 3 | (E) alone | 128.3–80.0 | 128.3–80.0 |
| Comparative Example 4 | (B):(F) = 50:50 | SmC* Phase did not appear | SmC* Phase did not appear |
| Comparative Example 5 | (B):(G) = 50:50 | SmC* Phase did not appear | SmC* Phase did not appear |

As clear from this table, in the cases where Compounds (C), (D) and (E) were used alone respectively (Comparative Examples 1–3) and where the mixtures other than this invention were used (Comparative Examples 4 and 5), the phase transition temperature regions of the SmC* phase were considerably high or the SmC* phase did not appear. In addition, it was also experimentally confirmed that even by using various mixing ratios of Compounds (B) to (F) and (B) to (G) for Comparative Examples 4 and 5, the SmC* phase did not appear.

In contrast, with those according to this invention, the phase transition temperature regions of the SmC* phase were considerably shifted to lower temperature sides, and in particular, by controlling the mixing ratio of Compounds (A) to (B) at between 60:40 and 40:60 as shown in Examples 2–4, it was possible to lower the phase transition temperature regions of the SmC* phase to normal temperature or its vicinity, thus very preferred.

The following Table 2 shows other examples of this invention. Example 6 is an example where Compound (H) below was used as a liquid crystal compound and Compound (B) above as an optically active substance. Example 7 is an example where Compound (H) below was used as a liquid crystal compound and Compound (D) above as an optically active substance. Example 8 is an example where Compound (I) below was used as a liquid crystal compound and Compound (B) above as an optically active substance. Example 9 is an example where Compound (I) above was used as a liquid crystal compound and Compound (E) above as an optically active substance.

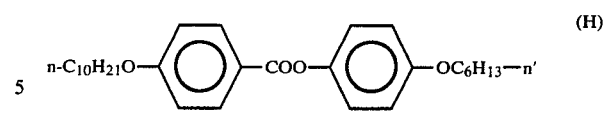

(p'-n'-Hexyloxyphenyl p-n-decyloxybenzoate)

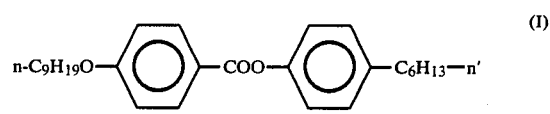

(p'-n'-Hexylphenyl p-n-nonanoxybenzoate)

TABLE 2

| | Liquid Crystal Compound | Optically Active Substance | Presence or Absence of Appearance of the SmC* Phase |
|---|---|---|---|
| Example 6 | (H) | (B) | SmC* Phase Present |
| Example 7 | (H) | (D) | SmC* Phase Present |
| Example 8 | (I) | (B) | SmC* Phase Present |
| Example 9 | (I) | (E) | SmC* Phase Present |

It has been confirmed that the phase transition temperature region of the SmC* phase appeared in each example was shifted to a lower temperature side and lies in the vicinity of normal temperature.

Since this invention is composed of the above-described construction and hence the temperature region of the SmC* phase can be lowered to a lower temperature side and further both liquid crystal compound and optically active substance have a chemically stable ester type bond, liquid crystal compositions having high reliability, also practical and suitable for use in field effect type liquid crystal display elements etc. may be presented.

What is claimed is:

1. A liquid crystal composition exhibiting a chiral smectic C phase which comprises a mixture of a liquid crystal compound having a non-chiral smectic C phase and an optically active compound, both of said liquid crystal compound and optically active compound having an ester linkage in the central core of its molecular structure.

2. The liquid crystal composition according to claim 1 wherein said liquid crystal compound is a compound of the following general structural formula:

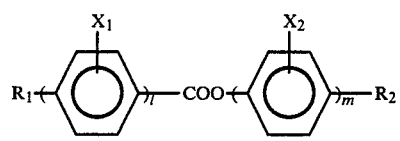

wherein
$R_1$ and $R_2$ each represent $-C_xH_{2x+1}$ or $-OC_xH_{2x+1}$ wherein x is an integer of 4–15,
z and m are each an integer of 1, 2 or 3, and
$X_1$ and $X_2$ each represent hydrogen, halogen, cyano or nitro.

3. The liquid crystal composition according to claim 2 wherein said liquid crystal compound is a compound of the following structural formula:

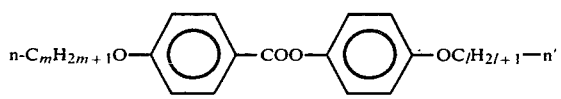

wherein m and z are each an integer of 4–15.

4. The liquid crystal composition according to claim 3 wherein said liquid crystal compound is at least one organic compound selected from the group consisting of p'-n'-octyloxyphenyl p-n-octyloxybenzoate, p'-n'-hexyloxyphenyl p-n-decyloxybenzoate and p'-n'-hexylphenyl p-n-nonanoxybenzoate.

5. The liquid crystal composition according to claim 1 wherein said optically active substance is a compound of the following general structural formula:

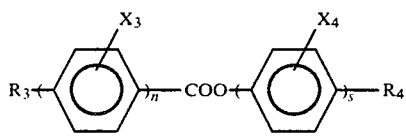

wherein $R_3$ and $R_4$ each represent $-R^*$, $-OR^*$, $-C_xH_{2x+1}$ or $-OC_xH_{2x+1}$ wherein $R^*$ represents alkyl containing an asymmetric carbon atom, x is an integer of 1–15, and at least one of $R_3$ and $R_4$ is $-R^*$ or $-OR^*$, n and s are each an integer of 1, 2 or 3, and $X_3$ and $X_4$ each represent hydrogen, halogen, cyano or nitro.

6. The liquid crystal composition according to claim 5 wherein said optically active substance is a compound of the following structural formula:

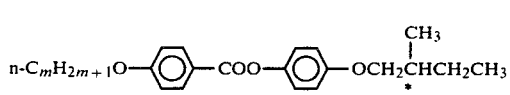

wherein m is an integer of 1–15, and C is an asymmetric carbon atom.

7. The liquid crystal composition according to claim 5 wherein said optically active substance is a compound of the following structural formula:

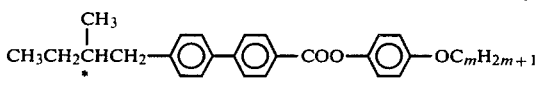

wherein m is an integer of 1–15, and C is an asymmetric carbon atom.

8. The liquid crystal composition according to claim 5 wherein said optically active substance is a compound of the following structural formula:

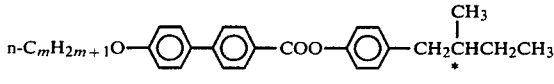

wherein m is an integer of 1–15, and C is an asymmetric carbon atom.

9. The liquid crystal composition according to claim 6 wherein said optically active substance is p'-act-amyloxyphenyl p-n-hexyloxybenzoate.

10. The liquid crystal composition according to claim 7 wherein said optically active substance is p-n-hexyloxyphenyl 4-act-amyl-biphenylcarboxylate.

11. The liquid crystal composition according to claim 8 wherein said optically active substance is p-act-amylphenyl 4-n-octyloxybiphenylcarboxylate.

12. The liquid crystal composition according to claim 1 wherein said liquid crystal compound is a compound of the following structural formula A and said optically active substance is a compound of the following structural formula B:

Structural Formula A

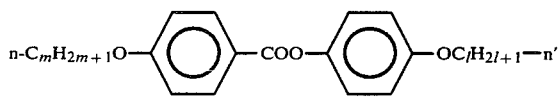

Structural Formula B

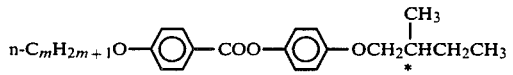

wherein m and z are each an integer of 4–15 m' is an integer of 1–15, and C is an asymmetric carbon atoms.

13. The liquid crystal composition according to claim 12 wherein said liquid crystal compound is p'-n'-octyloxyphenyl p-n-octyloxybenzoate and said optically active substance is p'-act-amyloxyphenyl p-hexyloxybenzoate.

* * * * *